United States Patent [19]

Chestnut et al.

[11] Patent Number: 4,851,624

[45] Date of Patent: Jul. 25, 1989

[54] CONTROL ASSEMBLY HAVING PANEL ILLUMINATION MEANS

[76] Inventors: Benjamin F. Chestnut, 1411 N. Shiloh Rd., Indianapolis, Ind. 46234; Ellis P. Lipp, Box 145A, Charlottesville, Ind. 46117; Charles H. Mark, 8800 Kirkridge La., Lafayette, Ind. 47905

[21] Appl. No.: 185,353

[22] Filed: Apr. 18, 1988

Related U.S. Application Data

[63] Continuation of Ser. No. 106,990, Oct. 5, 1987, abandoned, which is a continuation-in-part of Ser. No. 880,564, Jun. 30, 1986.

[51] Int. Cl.$^4$ .............................................. H01H 9/16
[52] U.S. Cl. .................................................... 200/317
[58] Field of Search ............. 200/317, 311, 312, 309, 200/310, DIG. 47

[56] References Cited

U.S. PATENT DOCUMENTS

| | | | |
|---|---|---|---|
| 2,699,141 | 1/1955 | Gaguski | 200/316 |
| 2,831,282 | 4/1958 | Hardesty | 200/310 |
| 3,755,661 | 8/1973 | Bouvrande | 200/DIG. 47 |
| 4,288,672 | 9/1981 | Puccini | 200/317 |
| 4,449,024 | 5/1984 | Stracener | 200/317 |
| 4,473,870 | 9/1984 | Sorenson | 200/310 |

Primary Examiner—Renee S. Luebke

[57] ABSTRACT

A control assembly has various types of control elements such as switches and potentiometers carried in a housing. The housing includes an applique which has openings through which manual operating levers extend to operate the control elements. The applique includes labelling to indicate the functions being controlled. Lights are carried in the housing with the light emanating therefrom being directed to the openings for sharp illumination at the openings, in the levers, and the labelling.

6 Claims, 4 Drawing Sheets

CONTROL ASSEMBLY HAVING PANEL ILLUMINATION MEANS

This application is a continuation, of application Ser. No. 07/106,990, filed 10-5-87, now abandoned, which is a continuation, of application Ser. No. 06/880,564, filed 6-30-86.

BACKGROUND OF THE INVENTION

The present invention pertains to a control system and more particularly to a control system having an applique carried on a housing for the control system and further having means to direct light to the applique.

The present invention is particularly adaptable to switch pod assemblies for automobiles. In present day automobiles, the number of control systems is continually increasing with the result that there are numerous levers and control function indicators. While this contributes to the ease and comfort in passenger cars, it does present the problem of providing clear indicators for the functions which are desired to be activated so that the automobile operator can quickly and safely perform a direct function. This is especially true at night.

Accordingly, there is provided a control system wherein the panel carrying the indicators for the functions available for operation are clearly and precisely illuminated.

SUMMARY OF THE INVENTION

In accordance with the present invention, there is provided a control assembly which, in general, comprises a housing carrying at least one control element, an applique carried by the housing and having at least one opening to the interior of the housing, manual operating means extending through the opening, light means carried within the housing, and light directing means carried in the housing.

DETAILED DESCRIPTION OF THE INVENTION

Figure 1:
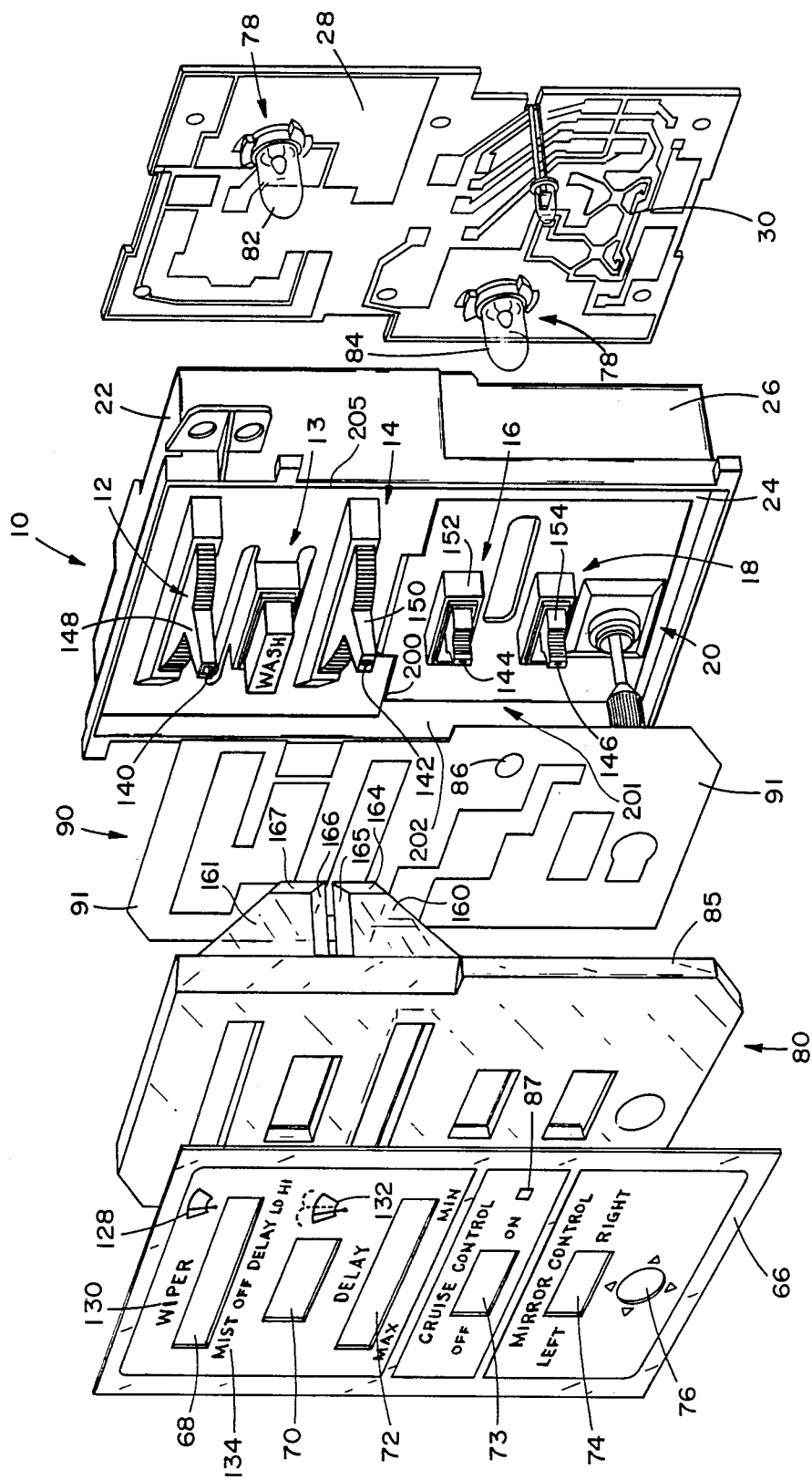
FIG. 1 is an exploded view of a control assembly utilizing the features of the invention.

Referring now to the drawings, and particularly FIG. 1, there is shown a control assembly 10 employing the features of the invention. Control elements 12, 13, 14, 16, 18 and 20 are carried within a housing 22 which includes a front plate 24, sidewalls 26 and a backplate opposite the front plate (not shown). Also carried within the housing is a printed circuit board 28 having electrical paths 30 thereon which cooperate with the control elements to provide electrical outputs from the control assembly through electrical terminals (not shown).

Figure 2:
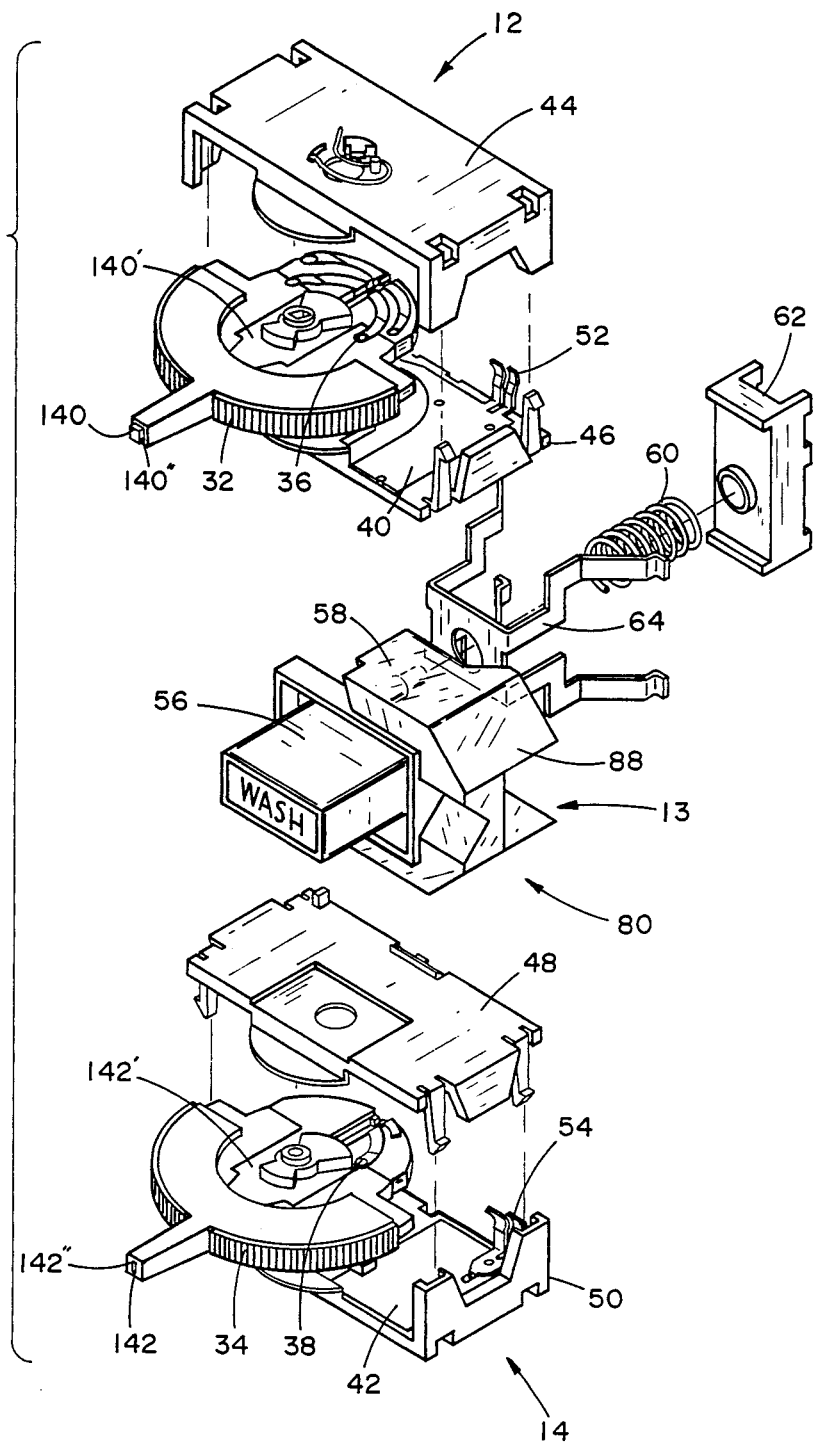
FIG. 2 is an exploded view showing a portion of the control assembly.

FIG. 2 illustrates typical control elements used in the control assembly. It should be understood that various types of control elements can be used and that those shown and described are illustrative only. Referring to FIG. 2, control elements 12 and 14 are commonly used rotary potentiometers which include rotatable rotors 32 and 34 which carry electrical contacts 36 and 38 and which engage resistance paths 40 and 42. The rotors are encased in separate compartments formed by plates 44–46 and 48–50. Each of the plates carries resistance paths 40 and 42 which terminate in electrical contacts 52 and 54 which engage appropriate electrical paths on printed circuit board 28. Manual rotation of rotors 32 and 34 provide variable electrical outputs through the resistance paths.

Control element 13 is a push button switch which includes a plunger 56 having a stem 58 which extends through a coil spring 60 and a seat 62. Seat 62 rests on a surface within the housing (not shown). Seat 62 carries an electrical contact 64. Pushing plunger 56 inward forces the electrical contact 64 inward to engage electrical paths on circuit board 28.

Again, it is to be understood that the control elements just described are typical examples that are used and in the interest of simplicity, a description of control elements 16, 18 and 20 are omitted.

In accordance with the present invention, an applique 66 is provided on the front plate 24 of the housing having openings 68, 70, 72, 74, and 76 in combination with a lighting means 78 and a light directing means 80 (FIGS. 1-3) which provide a sharp illumination at the openings. Lighting means 78 includes light bulbs 82 and 84 carried by printed circuit board 28 and which are electrically connected to an electrical outlet (now shown) of an automobile. The light bulbs illuminate the applique 66. An LED is also used to act as an indicator for the cruise control panel through openings 86 and 89.

Light directing means 80 includes a plastic translucent plate 85, plastic translucent prism 88, and light reflector means 90.

Figure 3:
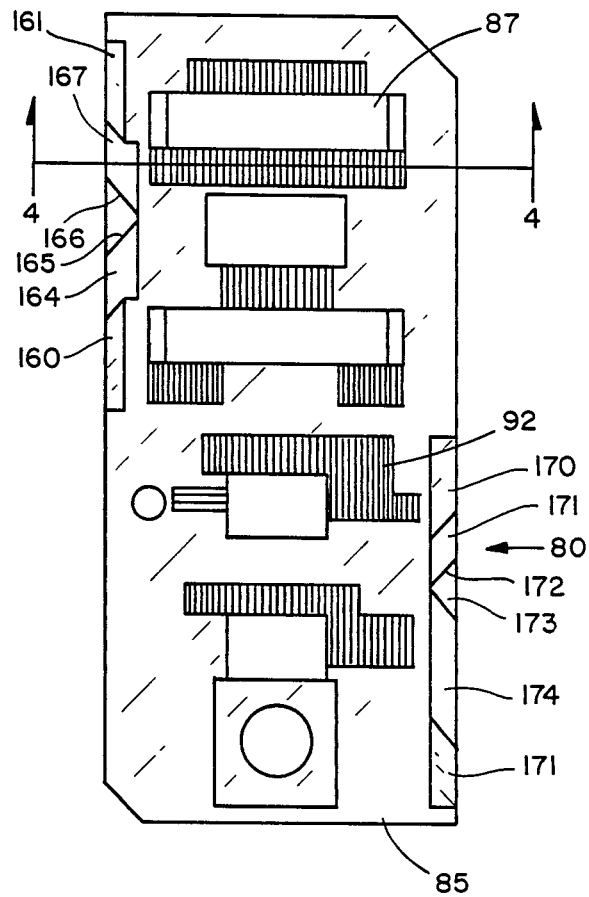
FIG. 3 is a view showing a light direction means of the invention.
Figure 4:
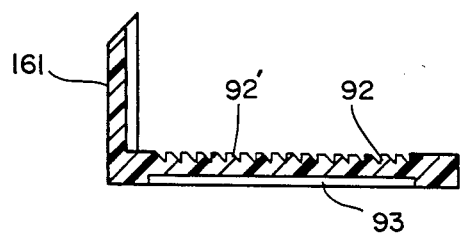
FIG. 4 is a section taken along the line 4—4 of FIG. 3.

As shown in FIGS. 1, 3 and 4 light directing means 80 also includes a pair of flanges 160 and 161 which are integrally formed with plate 85 and extend at an angle to the plate surface on the same side as film 91 back toward light 82. Flange 160 has beveled ends 164 and 165, and flange 161 has beveled ends 166 and 167. Light directing means 80 also includes another pair of flanges 170 and 171 with the beveled edges 171, 172, 173 and 174 respectively (FIG. 3) which similarly extend back toward light 84. As seen in FIG. 1, there is a gap 201 between front plate 24 and sidewall 202 created by the indentation of the front plate shown at 200; flanges 170 and 171 pass through gap 201 and are illuminated by bulb 84. Similarly flanges 160 and 161 pass through a gap that is hidden by the raised sidewall at 205 to be illuminated by bulb 82. Plate 85 and prism 88 are fabricated from an acrylic plastic. Light reflector means 90 includes a white paper film 91 that is carried on front plate 24 and, as will be described with reference to FIGS. 5 and 6, white sections of paint on the back of applique 66. Paper film 91 reflects light from plate 85. With particular reference to FIGS. 3 and 4, plate 85 also includes serrations 92 having slanted surfaces 92'. The serrations act as light pipes to further direct the light emanating from the light bulbs. A depressed area 93, beneath the serrations, aids in evenly distributing light across the lettering of the applique. As shown, plate 85 has openings 87 adapted to mate the openings in the applique.

Figure 5:
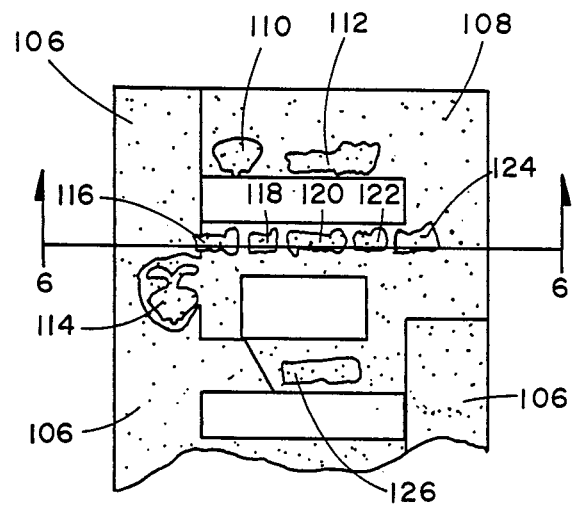
FIG. 5 is a view showing another light directing means of the invention.
Figure 6:
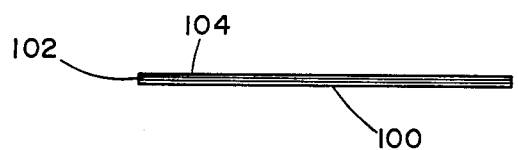
FIG. 6 is a section taken along the line 6—6 of FIG. 5.

Referring to FIGS. 1, 5 and 6, the applique 66 can be described. Applique 66 includes a polycarbonate sheet 100 onto which three layers of silk screening 102 are applied with a clear adhesive 104 applied over the silk screening. The three layers 102 of silk screening includes a white paint 106, a black paint 108 and a blue paint 110, 112, 114, 116, 118, 120, 122, 124 and 126. The white paint serves as a light reflector while the black paint serves as a light absorber. The white and black portions are strategically located to provide maximum light intensity on the lettering of the applique. The blue paint directs a blue color light at corresponding indicators at their respective lettering and symbols. Thus blue paint portion 110 provides a blue glow at dial 128, portion 112 at the "wiper" indicator 130, portion 114 at dial 132, portions 116, 118, 120, 122 at each of the lettering in line 134, and portion 124 at the "delay" indicator 126.

Adhesive 104 secures plate 85 to the applique. A suitable adhesive would be 3M Company's #467, for example.

With reference to FIG. 1, also included in light directing means 80 are individual light pipes 140, 142, 144, 146, for manual operating levers 148, 150, 152, and 154 of their respective control elements. A typical light pipe is shown in FIG. 2. With reference to control elements 12 and 14, each has a light pipe 140 and 142 having a base portion 140' and 142' and a stem 142" extending through the controls respective handles. The light pipes are solid and are constructed of a suitable material such as green translucent polycarbonate. The light pipes in conjunction with prism 88 provides illumination at the operating levers for easy location, especially at night.

What is claimed is:
1. A control assembly comprising
   (a) a housing carrying at least one control element within said housing,
   (b) light means carried within said housing,
   (c) light directing means carried on said housing, said light directing means including: a translucent plate having first openings aligned with second openings in said housing, said translucent plate including serrations disposed along peripheries of said first openings; an opaque member between said light and said plate and covering said serrations; and plate extension means exposed to said light for reflecting light through said plate to said serrations; and
   (d) control element manual operating means coupled to said control element and extending through said first and second openings.
2. A control assembly comprising:
   (a) a housing carrying at least one control element within said housing,
   (b) light means carried within said housing,
   (c) light directing means carried on said housing, including a translucent plate having first openings aligned with second openings in said housing, said translucent plate including serrations disposed along peripheries of said first openings to further divert light,
   (d) an applique carried on said translucent plate and having third openings in line with said first and second openings,
   (e) control element manual operating means coupled to said control element and extending through said first, second and third openings, and
   (f) a depressed area on the surface of said translucent plate on which said applique is carried, said depressed area located directly between said serrations and the portion of said applique to be illuminated by light directed by said serrations.
3. A control assembly according to claim 2 wherein said light directing means further includes a light reflector means carried between said translucent plate and said housing.
4. A control assembly according to claim 2 wherein there are light reflector means and light absorbing means disposed between said translucent plate and said applique.
5. A control assembly according to claim 4 further including color transmitting means disposed between said translucent plate and said applique.
6. A control assembly according to claim 2 further including a light pipe carried in at least one of said control element manual operating means.

* * * * *